United States Patent
Daoud

[19]

[11] Patent Number: 6,118,664
[45] Date of Patent: Sep. 12, 2000

[54] HANDLE FOR PLUG-IN PROTECTORS

[75] Inventor: Bassel Hage Daoud, Parsippany, N.J.

[73] Assignee: Lucent Technologies, Inc., Murray Hill, N.J.

[21] Appl. No.: 09/229,292

[22] Filed: Jan. 13, 1999

[51] Int. Cl.⁷ .................................................. H02H 09/04
[52] U.S. Cl. ........................ 361/728; 361/730; 361/732; 174/50.54; 439/214
[58] Field of Search .................................... 361/728, 730, 361/732, 126, 117, 119, 118, 103, 106; 174/50.52, 50.54; 439/532, 214

[56] References Cited

U.S. PATENT DOCUMENTS

| | | | |
|---|---|---|---|
| 4,262,317 | 4/1981 | Baumbach | 361/124 |
| 4,424,546 | 1/1984 | Smith | 361/119 |
| 4,594,635 | 6/1986 | Scheithauer et al. | 361/119 |
| 4,796,150 | 1/1989 | Dickey et al. | 361/119 |
| 4,944,003 | 7/1990 | Meyerhoefer et al. | 361/412 |
| 5,166,855 | 11/1992 | Turner | 361/119 |
| 5,422,779 | 6/1995 | Borkowicz | 361/56 |

Primary Examiner—Jeffrey Gaffin
Assistant Examiner—David Foster
Attorney, Agent, or Firm—Howard C. Miskin, Esq.; Gloria Tsui-Yip, Esq.

[57] ABSTRACT

A plug-in surge protector having an improved handle for facilitating and isolating the removal of an individual protector from a protector panel without interfering with adjacent protectors. The plug-in protector comprises a body having a front end and a rear end. Extending from the rear end of the body are terminals for plugging into sockets on a protector panel. Extending from the front end of the body is a handle having a reduced width and concave upper and lower surfaces. On the concave surfaces are horizontal teeth running across the width of the handle. It is preferable that the teeth are tilted towards the rear end of the body and against the direction of removal of the protector from the panel. The reduced width of the handle allows the removal of a single protector without touching or interfering with adjacent protectors plugged into the panel. The teeth on the handle increases the frictional surface area to facilitate removal of the protector from the panel.

11 Claims, 4 Drawing Sheets

HANDLE FOR PLUG-IN PROTECTORS

FIELD OF THE INVENTION

The invention relates to an improved handle that facilitates removal of plug-in protectors used in a building entrance protector.

BACKGROUND OF THE INVENTION

A building entrance protector, i.e. junction box, provides an interface for cables from the central office of the service provider for distribution to subscribers throughout the building served by the junction box. A typical building entrance protector contains a protector field, which provides surge protection to each subscriber's line. The protector field comprises a panel having sockets thereon for plug-in protectors, which are solid state devices printed on wiring board. A typical protector field has a five by five configuration. Due the need to conserve space within a junction box, the twenty-five plug-in protectors are placed abutting each other on the panel.

A typical plug-in protector has five terminals. Three of the five terminals are longer and are connected to the solid state surge protective device within the protector. The remaining two shorter terminals are for connection to the subscriber's line. Different length terminals allow a service technician to unplug the two shorter terminals while keeping the longer terminals in the sockets in order to service or discontinue service of a particular subscriber's line while safely maintaining surge protection on the line.

A typical five-pin plug-in protector has a rectangular box shape measuring ½ inch wide, ¾ inch high and 1⅝ inch long. Extending from one end of the protector are five terminals and from the opposite end is an integral tab handle having the width of the protector. At the end of the tab is a small ledge that facilitates the gripping of the tab for removal of the protector.

In a five by five protector field where protectors are placed closely adjacent each other, the tab handle provides the necessary spacing between vertically adjacent protectors for a technician to place his/her thumb and index finger on the tab for removal of a particular protector. However, the tab handle remains closely adjacent to other horizontally adjacent protectors. Due to the limited width of the tab handle and the protector, ½ inch, an attempt to remove one protector would likely interfere with or inadvertently remove horizontally adjacent protectors because the width of an average thumb measures ¾ inch wide, wider than the width of the protector. Although the small ledge at the end of the tab facilitates gripping of the tab, it also disadvantageously facilitates gripping of horizontally adjacent protectors and accidentally removing them. Likelihood of accidental removal of horizontally adjacent protectors increases for technicians having thumbs wider than the average width. Even if technicians are careful in the placement of his/her thumb, he/she would nevertheless waste energy in compressing only on the one tab handle of the protector to be removed, which decreases the efficiency of the technician, who in the course of a day, may remove a large number of protectors.

In view of the safety design of the five-pin plug-in protector, even slight interference with adjacent protectors can lead to either accidental disconnection or intermittent connection for neighboring subscriber lines. Complete removal of a protector is not necessary to disconnect service. Loosening of the two shorter terminals from the protector field panel may not be apparent in an array of closely adjacent protectors. If the affected subscriber line is transferring voice or data through a modem or facsimile, it would affect the quality of the service. In the event that the technician who failed to notice the accidental removal or loosening of adjacent protectors, service to adjacent lines would be disconnected until another technician returns to the site to examine the equipment and re-plug the protectors. This is both time consuming and wasteful of resources.

Therefore, there is a need for an improved handle for a plug-in protector that facilitates and isolates the removal of a single protector without interfering with closely adjacent protectors located in a protector field.

SUMMARY OF THE INVENTION

The invention provides an improved handle for facilitating and isolating the removal of an individual plug-in protector located in a protector field of a building entrance protector.

The improved handle of the plug-in protector is narrower than the prior art tab handle and provides frictional surfaces to facilitate and isolate the removal of a single protector without interfering with adjacent protectors.

The plug-in protector of this invention comprises a rectangular shaped body having a front end and a rear end. Extending from the rear end are five terminals, three of which are connected to a solid state surge protective device housed within the body. The remaining two terminals are for connection to a subscriber's line to which surge protection is provided.

Extending from the front end is an integral handle having a reduced width. The reduced width handle provides spacing between horizontally adjacent protectors in a protector field to allow an average thumb to grip an individual handle without touching adjacent handles. The integral handle has opposite upper and lower concave surfaces. On both concave surfaces are horizontal teeth, ribs or grooves, running across the width of the handle. It is preferred that the horizontal teeth are tilted against the direction of removal of the protector from the protector panel to improve the gripping of the handle. When a technician grips the handle between the fingers, the teeth sink into the soft tissue of the fingertips to produce additional friction to facilitate removal of the protector. The teeth increases the friction between a thumb and the protector to compensate for the lost surface area from the reduced width.

DETAILED DESCRIPTION OF THE PREFERRED EMBODIMENTS

Figure 1:
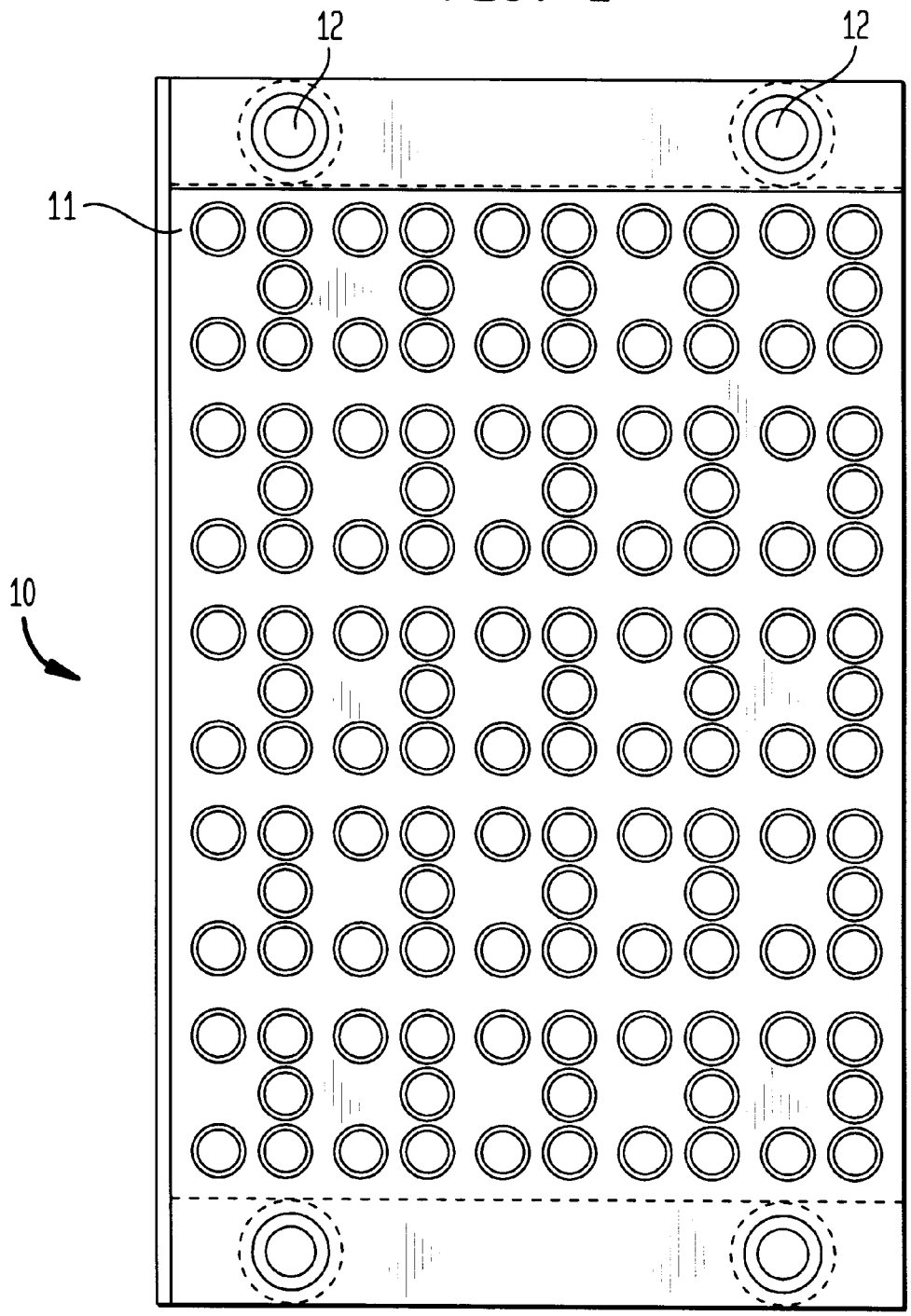
FIG. 1 is a front elevational view of a five-by-five protector field panel for five-pin plug-in protectors.
Figure 6:
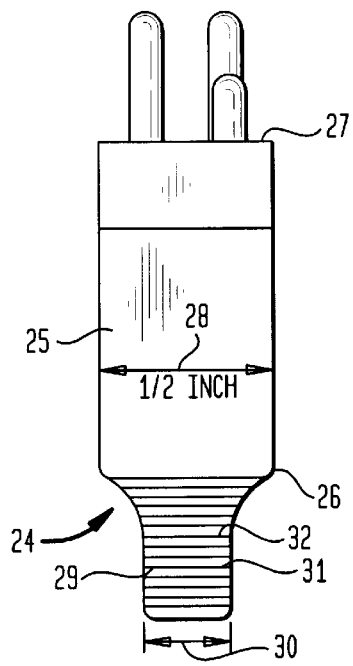
FIG. 6 is a top plan view of the five-pin plug-in protector of the present invention, illustrating the reduced width handle and horizontal teeth running across the handle.
Figure 7:
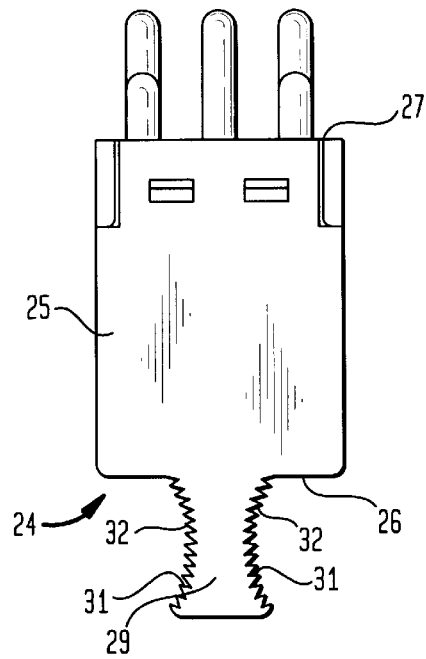
FIG. 7 is a side view of FIG. 6, illustrating the opposite upper and lower concave surfaces of the handle and horizontal teeth tilted against the direction of removal of the present invention from a protector field.

With reference to the drawings, wherein the same reference number indicates the same element throughout, there is shown in FIG. 1 a front elevational view of a protector field panel 10 for five-pin plug-in protectors of both the prior art type 13 (FIGS. 2–4) and the present invention 24 (FIGS. 6–7). Protector field panel 10 has a five by five configuration, with sockets 11 for twenty-five plug-in protectors. Panel 10 provides holes 12 for mounting panel 10 in a junction box (not shown).

Figure 2:
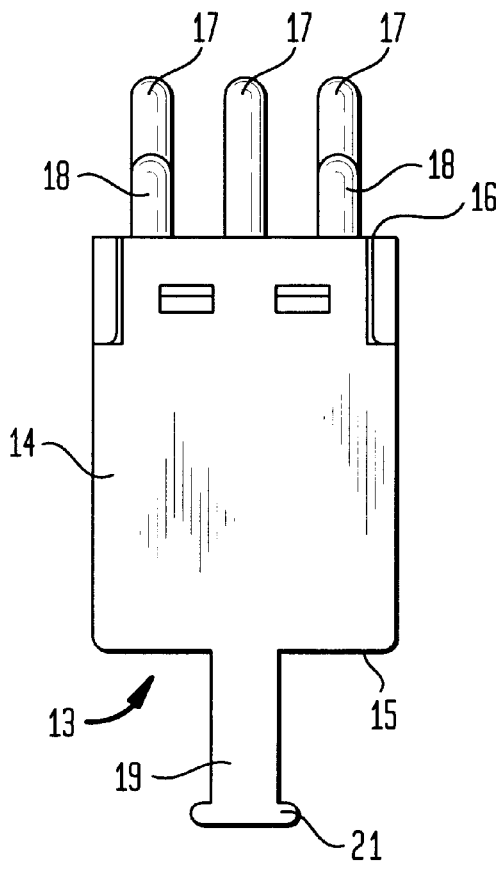
FIG. 2 is a side view a prior art five-pin plug-in protector, illustrating the integral tab handle having a small ledge at the end thereof.
Figure 4:
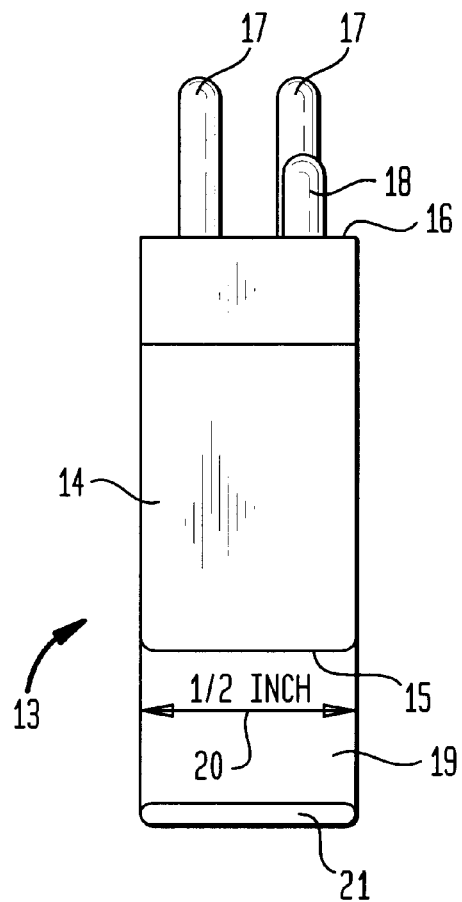
FIG. 4 is a top plan view of FIG. 2, illustrating the width of the integral tab handle in a prior art five-pin plug-in protector.
Figure 3:
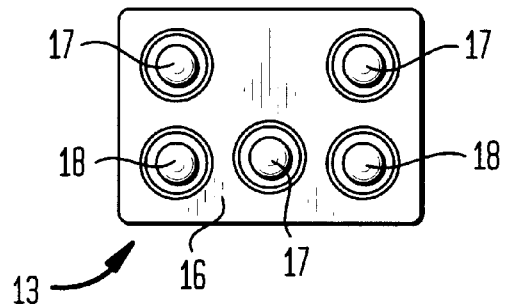
FIG. 3 is a rear elevational view of FIG. 2, illustrating the arrangement of the five terminals.

FIGS. 2–4 show a prior art five-pin plug-in protector 13. Plug-in protector 13 comprises a rectangular shaped body 14 having a front end 15 and a rear end 16. Extending from the rear end 16 are five terminals, three longer terminals 17 and two shorter terminals 18. The three longer terminals 17 are connected to a solid state surge protective device contained within body 14 (not shown). The two shorter terminals 18 are for connection with an individual subscriber's line for surge protection (not shown). Extending from the front end 15 is a tab handle 19 having the same width 20 as the body 14, typically ½ inch. At the end of tab handle 19 is a small ledge 21 that facilitates gripping of tab handle 19.

Figure 5:
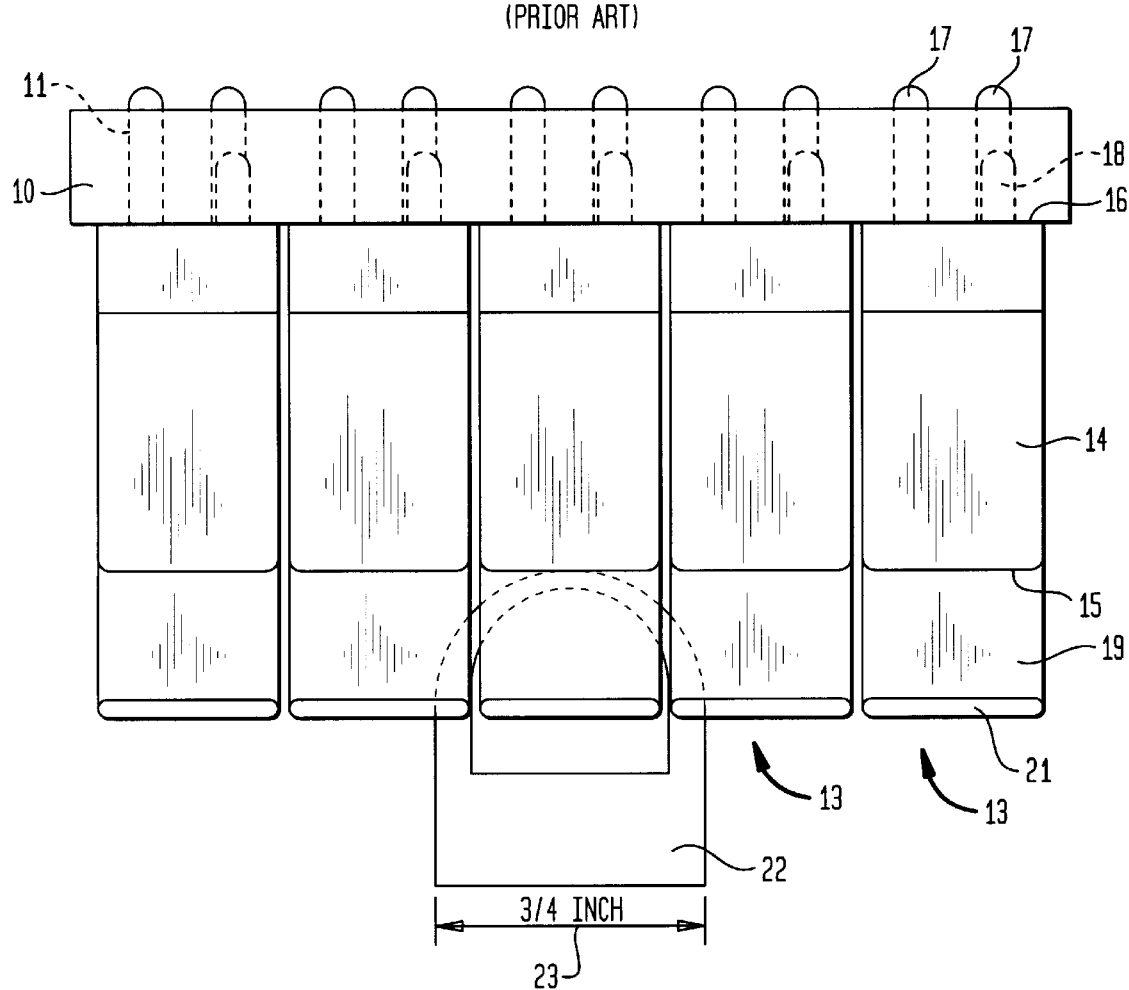
FIG. 5 is a top plan view of five prior art five-pin plug-in protectors horizontally plugged into the sockets of a protector field panel of FIG. 1, illustrating the closely adjacent protectors and tab handles and the gripping of adjacent protector handles.

FIG. 5 illustrates five prior art plug-in protectors 13 plugged horizontally into sockets 11 of protector field panel 10 and are shown to be closely adjacent each other. FIG. 5 also demonstrates a drawback of handle 19 of a prior art plug-in protector 13. When a technician with a thumb 22 having an average width 23 of ¾ inch attempts to grip handle 19 to remove a single protector 13 between other closely adjacent protectors 13, it is likely that adjacent protectors 13 will also be removed accidentally because width 23 of thumb 22 extends over the width 20 of handle 19.

The improved five-pin plug-in protector 24 in accordance with the present invention, as shown in FIGS. 6 and 7, comprises a rectangular shaped body 25 having a front end 26, a rear end 27 and a width 28 of typically ½ inch. Extending from the rear end 27 are five terminals, similar to the three longer terminals 17 and two shorter terminals 18 of prior art plug-in protector 13 as shown in FIGS. 2–4. Extending from the front end 26 is a handle 29 having a reduced width 30 less than the width 28 of body 25. As illustrated in FIG. 6, handle 29 is centered between the side edges of body 25 by curved surfaces from the opposite side edges of body 25 and then generally parallel edges of handle 29. The sides of handle 29 may be tapered from the ends of body 25 to form the reduced width 30.

Handle 29 of the present invention has opposite upper and lower concave surfaces 31. On both concave surfaces 31 are horizontal teeth 32 running across the width 30 of handle 29. The teeth 32 are tilted backwards towards rear end 27 of protector 24 and against the direction of removal of the protector 24 from a protector field panel 10. The horizontal teeth 32 provide additional frictional for gripping handle 29 with the soft tissue of a technician's fingertips to facilitate removal of protector 24 from a protector field panel 10. Other friction producing surfaces may be used, such as ribs, grooves, protuberances or cross cut shapes. Also, while both upper and lower surfaces are shown concave, at least one surface should be concave.

Figure 8:
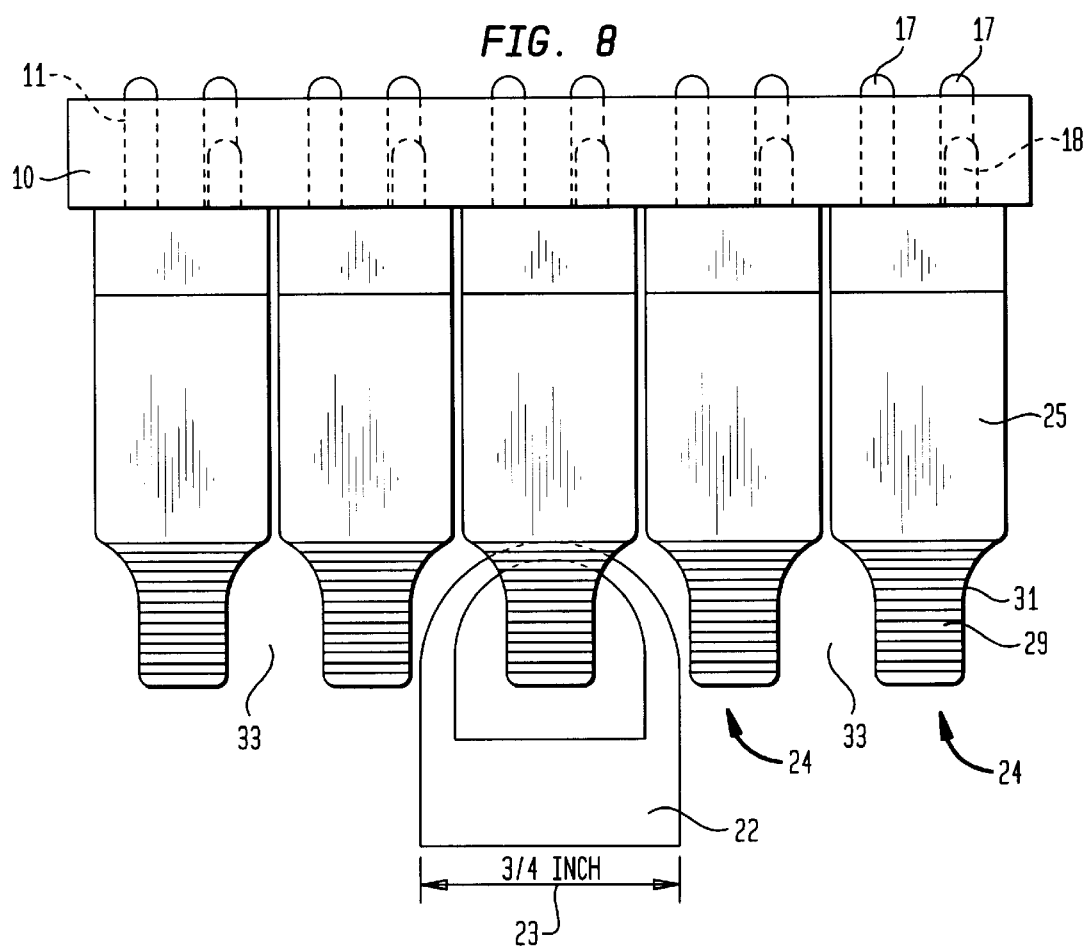
FIG. 8 is a top plan view of five five-pin plug-in protectors of the present invention horizontally plugged into the sockets of a protector field panel of FIG. 1, illustrating the spacing provided between adjacent handles and the gripping of a single protector handle.

FIG. 8 illustrates five plug-in protectors 24 of the present invention plugged horizontally into sockets 11 of protector field panel 10 and are shown to be closely adjacent each other. The reduced width 30 of handle 29 provides spacing 33 between horizontally adjacent protectors 24 such that when a technician with a thumb 22 having an average width 23 of ¾ inch attempts to grip handle 29 to remove a single protector 24 between other closely adjacent protectors 24, only one protector 24 would be removed, without interfering or touching adjacent protectors 29.

Although certain features of the invention have been illustrated and described herein, other better modifications and changes will occur to those skilled in the art. It is, therefore, to be understood that the appended claims are intended to cover all such modification and changes that fall within the spirit of the invention.

What I claim is:

1. A device for surge protection of a line comprising
   a body having a front end and a rear end;
   a surge protective circuitry housed within said body;
   a plurality of terminals extending from said rear end, a number of terminals being connected to said surge protective circuitry, other of said terminals being connected to said line being surge protected; and
   an integral handle having upper and lower surfaces extending from said front end of said body, said handle being reduced in width from said body and having at least said upper or lower surface concave in shape with a frictional producing surface.

2. The device according to claim 1 wherein at least one of said concave surfaces having a plurality of teeth running across the width of said handle.

3. The device according to claim 2 wherein said plurality of teeth being tilted towards said rear end of said body.

4. The device according to claim 1 wherein three of said terminals connected to said surge protective circuitry are longer than the other terminals.

5. The device according to claim 1 wherein two of said terminals connected to said line being surge protected are shorter than the other terminals.

6. The device according to claim 1, wherein said reduced width handle having sides generally tapering from said body toward each other.

7. The device according to claim 1, wherein said upper and lower surfaces of said handle being concave in shapes.

8. The device according to claim 1, wherein said upper and lower surfaces of said handle having frictional producing surfaces.

9. A device for plugging into a protective field panel of a junction box for surge protection of a telephone line comprising:
   a body having a front end and a rear end;
   a surge protective circuitry housed within said body;
   a plurality of long and short terminals extending from said rear end, said long terminals being connected to said surge protective circuitry and said short terminals being connected to said line being surge protected; and
   an integral handle having an upper and a lower surfaces extending from said front end of said body, said handle being reduced in width from said body and having at least said upper or lower surface being concave with a plurality of teeth running across the width of said handle, thereby providing more frictional surface area to facilitate and isolate the removal of said device from said panel.

10. A protective field for surge protection of telephone lines located in a junction box comprising:

a panel having a plurality of sockets;

a plurality of surge protectors, each of said protector comprises a body having a front end and a rear end, a surge protective circuitry housed within said body, a plurality of long and short terminals extending from said rear end for plugging into said sockets, said long terminals being connected to said surge protective circuitry and said short terminals being connected to each of said telephone line being surge protected and an integral handle having an upper and a lower surface extending from said front end, said handle being reduced in width from said body and having at least said upper or lower surface concave in shape;

said reduced width of adjacent protectors defining spacing between said adjacent handles to isolate the removal of one protector from said plurality of protectors plugged into said sockets of said panel without interfering with or touching adjacent protectors.

11. The protective field according to claim 10 wherein said concave surface having a plurality of teeth running across the width of said handle, said teeth being tilted towards said rear end of said body for facilitating the removal of each of said protectors plugged into said sockets of said panel.

* * * * *